May 1, 1962 D. L. BLACHLY 3,032,672
BRUSH HOLDER FOR ELECTRIC MOTORS
Filed Aug. 27, 1959 3 Sheets-Sheet 1

Inventor
Donald L. Blachly
By Hamilton Jones
Attorneys

May 1, 1962 D. L. BLACHLY 3,032,672
BRUSH HOLDER FOR ELECTRIC MOTORS
Filed Aug. 27, 1959 3 Sheets-Sheet 2

Inventor
Donald L. Blachly

May 1, 1962 D. L. BLACHLY 3,032,672
BRUSH HOLDER FOR ELECTRIC MOTORS
Filed Aug. 27, 1959 3 Sheets-Sheet 3

Inventor
Donald L. Blachly
By
Attorney

United States Patent Office 3,032,672
Patented May 1, 1962

3,032,672
BRUSH HOLDER FOR ELECTRIC MOTORS
Donald L. Blachly, Milwaukee, Wis., assignor to John Oster Manufacturing Co., Milwaukee, Wis., a corporation of Wisconsin
Filed Aug. 27, 1959, Ser. No. 836,459
8 Claims. (Cl. 310—239)

This invention relates to electric motors, and particularly fractional horsepower motors such as are used to power food comminuting and blending machines and the like.

It is an object of this invention to provide simple and inexpensive means for securely but readily removably fastening insulating brush holder tubes in the frame of an electric motor, which means incorporates a unitary spring clip for each brush holder tube by which a bayonet connection between the brush holder tube and the motor frame is maintained operative.

More specifically, it is one of the objects of the present invention to provide means for mounting an insulating brush holder tube on the frame of an electric motor in such a manner that installation of each brush holder is accomplished merely by axial insertion of the tube into a bored receptacle in the frame, and by subsequent rotation of the tube to a detent defined position in which the brush holder tube is confined against axial displacement out of the receptacle.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which.

Figure 1:
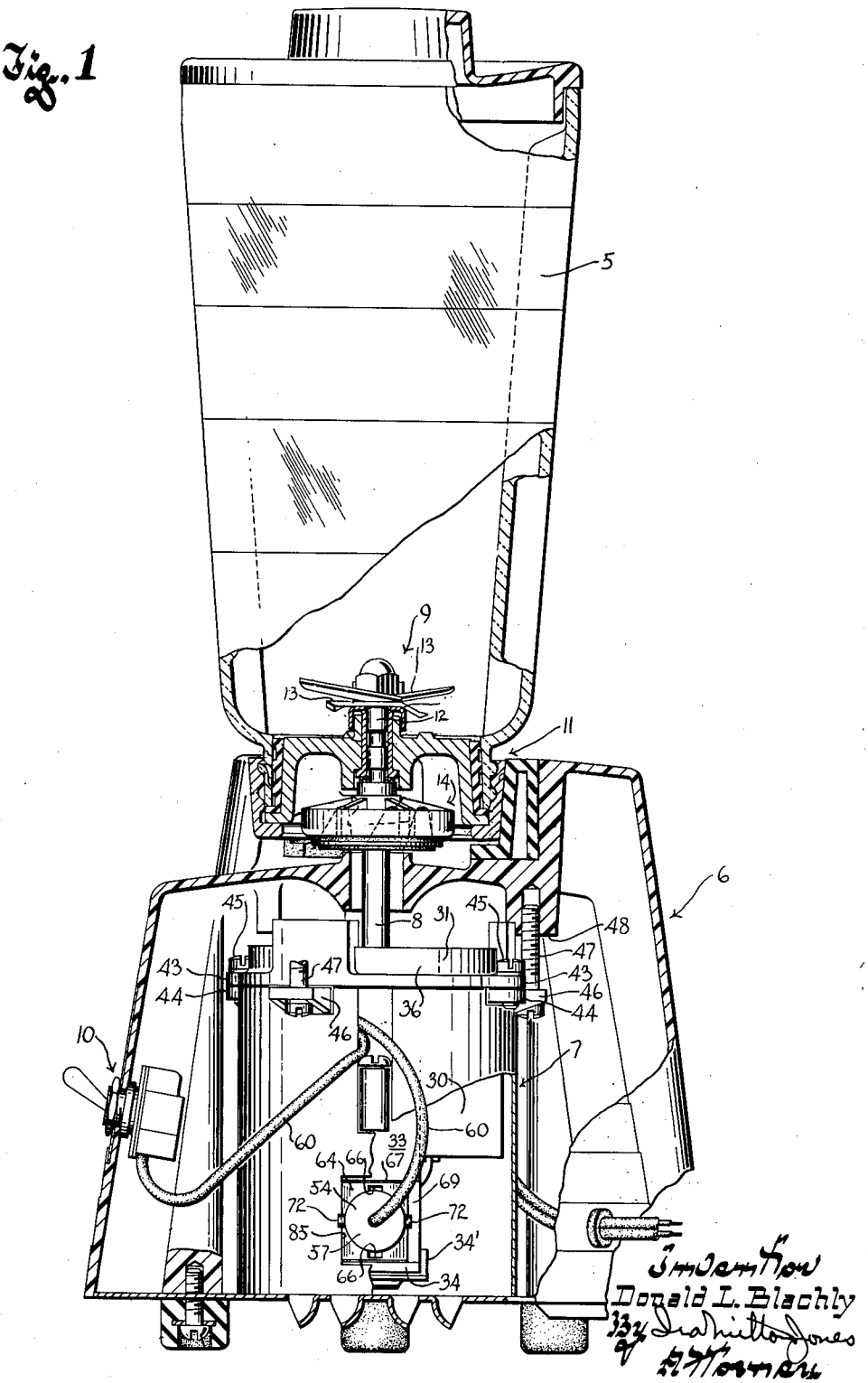
FIGURE 1 is a side elevational view of a food comminuting and blending machine incorporating this invention, with portions cut away and shown in section.

Referring now more particularly to the accompanying drawings, the invention is shown incorporated in a food comminuting and blending machine which comprises an upright mixing vessel 5, readily removably mounted on a base 6 that provides a housing for a motor 7 having an upright shaft 8 by which an agitator 9 in the bottom of the mixing vessel is rotatably driven. Accessible at the exterior of the housing is a switch 10 by means of which energization of the motor may be controlled.

The agitator 9 comprises an upright agitator shaft 12 which is journaled in a removable closure, designated generally by 11, for the open bottom of the mixing vessel. A plurality of agitator blades 13 are secured to the top of the agitator shaft 12, and at its bottom said shaft is readily disconnectibly coupled with the upper end of the motor shaft by means of a driving connection 14.

The electric motor by which the machine is powered embodies a number of novel features that make for lightness as well as ease and economy of manufacture without sacrificing efficiency or dependability. As is conventional, the motor has a stator designated generally by 25, consisting of a laminated core 26 with suitable field windings 27 thereon. The rotor comprises a wound armature 28 having the shaft 8 projecting coaxially from both ends thereof and a coaxial commutator 29 directly beneath the armature.

Figure 3:
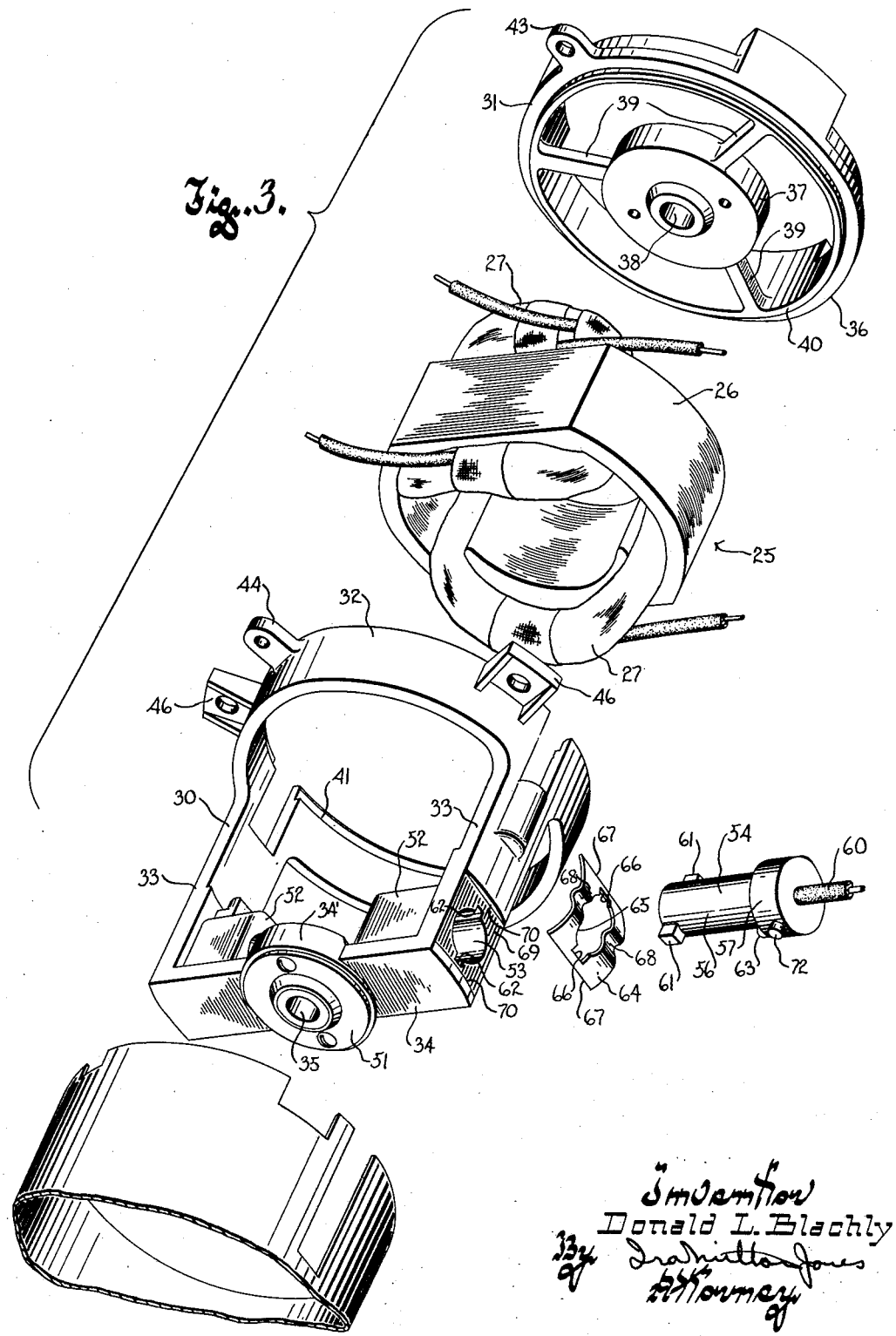
FIGURE 3 is a disassembled perspective view of the motor of the machine of this invention.

The elements of the motor are carried by a frame which is best seen in FIGURE 3 and which consists, in general, of a main frame member 30 and a spider-like end member 31. The main frame member 30, which may be readily formed as a unitary die casting, comprises an annular locating ring 32 having a pair of legs 33 projecting downwardly parallel to its axis from diametrically opposite sides thereof, and a cross member 34 connecting the lower ends of the two legs. The medial portion of the cross member is enlarged, as at 34′, to form a support for the lower motor shaft bearing 35 by which the latter is held coaxial with the locating ring 32.

The spider-like end member 31, which may also be formed as a unitary die casting, consists of an annular outer element 36, an inner hub-like member 37 in which the upper shaft bearing 38 is seated, and a plurality of arms 39 extending radially from the inner member and connecting the same with the outer annular element 36 to hold the bearing 38 coaxial with the annular element.

A downwardly projecting circumferential flange 40 on the annular outer element of the spider-like end member engages in an upwardly opening circumferential recess 41 in the inner surface of the locating ring 32 to hold the spider-like end member coaxial with the locating ring and thus insure coaxiality of the upper shaft bearing 38 with the lower shaft bearing 35. Suitable radially outwardly projecting lugs 43 and 44 on the spider-like end member and on the locating ring, respectively, are adapted to receive screws 45 by which the two frame members are fastened together. Other lugs 46 on the locating ring portion of the main frame member provide for securement of the motor frame to the base by means of screws 47 extending upwardly through said lugs 46 and threaded into bosses 48 projecting downwardly from the top wall of the base (see FIGURE 1).

Figure 2:
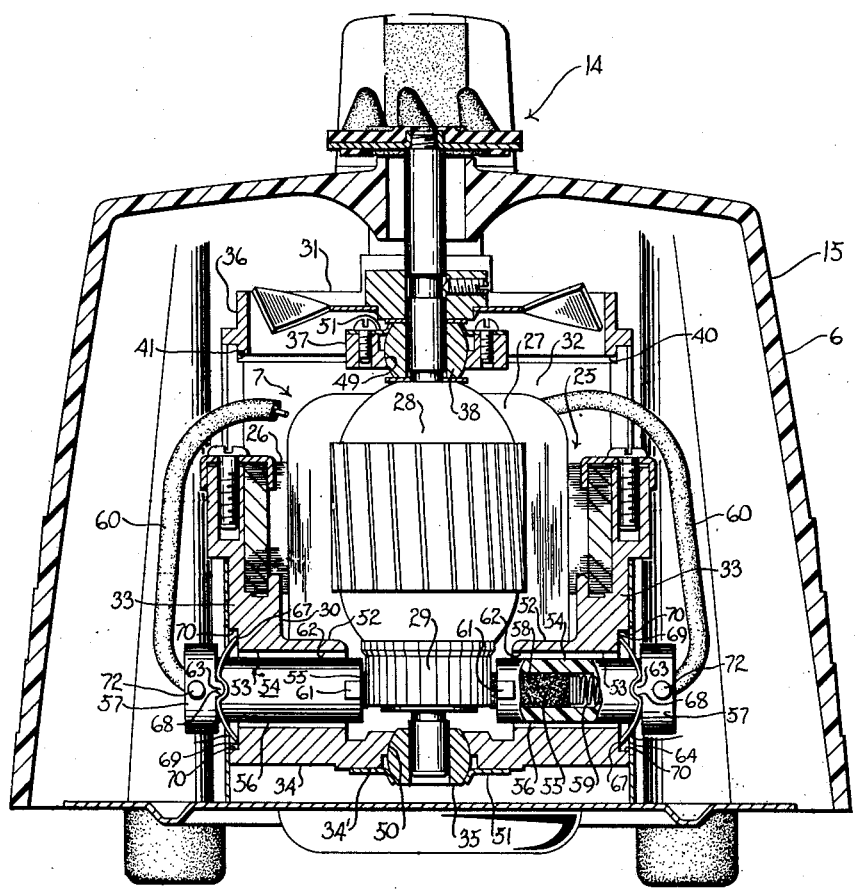
FIGURE 2 is a vertical sectional view through the base of the machine taken on a plane at right angles to that of the section in FIGURE 1.

Both the upper and the lower shaft bearings, which are formed from a suitable bearing material, have substantially spherical outer surfaces, as best seen in FIGURE 2, and are received in correspondingly shaped wells 49 and 50 in the hub portion 37 of the spider-like member and in the enlarged medial portion 34′ of the cross member 34 respectively. Washer-like retainers 51, secured over the bearing members, hold them in the wells in their respective supporting members and permit the bearing members to have a limited degree of angular adjusting motion by which they can accommodate slight misalignment of the upper and lower bearing supporting members.

The main frame member also includes a pair of brush holder receptacles 52 comprising integral block-like portions formed at the junctions of the legs 33 and the transverse bearing supporting member 34 and extending partway inwardly along the latter, substantially to its enlarged medial portion 34′, to have their opposing inner ends spaced from the commutator 29. Each brush holder receptacle has a bore 53 therethrough which is adapted to receive a brush holder tube 54 in which a conductive brush 55 is mounted. The bores 53 of the two receptacles 52 have a common axis extending substantially at right angles to the shaft bearing axis and intersecting the same in line with the commutator.

Each brush holder tube has a substantially cylindrical body portion 56 with a non-circular well 58 opening to its inner end, in which the brush is endwise slidable, and has a larger diameter coaxial cylindrical head portion 57 at its outer end. A compression spring 59, confined between the bottom of the well and the adjacent end of the brush, biases the brush towards engagement with the commutator, and the customary "pigtail" conductor (not shown) electrically connects the brush with its lead 60.

A pair of diametrically opposite bayonet lugs 61 project radially from the inner end portion of each brush holder tube to provide a bayonet connection between the tube and the receptacle. A pair of lengthwise extending grooves 62 in each receptacle, opening to the bore 53 therein diametrically opposite one another, provide clearance for the bayonet lugs 61 as the brush holder tube is inserted axially into the receptacle, and the tube may then be rotated to a detent defined position in which the lugs 61 are out of alignment with the grooves 62 and are engaged with the inner face of the receptacle to prevent axial withdrawal of the tube out of the receptacle.

The detent means for establishing the described rotational position of each brush holder tube comprises a pair of detent lugs 63 projecting axially from the head portion 57 of the brush holder tube and a unitary spring clip 64. The spring clip, which is stamped or otherwise formed from a rectangular blank of resilient metal, has a central aperture 65 that corresponds in shape to the bore in the receptacle, being circular with diametrically opposite inwardly opening notches 66 adjacent to a pair of opposite edges 67 (see FIGURE 3); so that the inner end portion of the brush holder tube can be passed through the spring clip and the latter can embrace the tube inwardly adjacent to its enlarged head portion 57. Each spring clip is bowed so that its edges 67 adjacent to the notches 66 are coplanar, and it has a shallow depression 68 intermediate said edges formed by a bend of opposite curvature to its bow. Hence each clip may be said to be bent to a shallow W-shaped cross section.

Each brush holder receptacle has a substantially flat outer face 69 defined by a slabbed off area on its adjacent leg 33 of the main frame member, and said flat face terminates, at its top and bottom at radially outwardly projecting ledges or shoulders 70. The edges 67 of the clip engage the flat face 69 to hold the medial portion of the clip, having the depression 68 therein, spaced outwardly from said face on the frame member, and said edges 67 on the clip also engage the ledges 70 to preclude rotation of the clip out of a position in which its notches 66 are aligned with the grooves 62 in the receptacle. Each of the detent lugs 63 on each brush holder tube is axially in line with one of the bayonet lugs 61 thereon, and therefore each brush holder tube may be assembled to the frame by holding a clip in the position just described and axially inserting a brush holder, with a brush therein, through the clip and into the bore in the receptacle. Rotation of the brush holder tube through an angle of 90° then carries the bayonet lugs 61 out of alignment with the grooves 62 to establish the bayonet connection between the tube and the receptacle, and brings the detent lugs 63 into detent defining engagement with the shallow depressions 68 in the spring clip.

Because of the convex bow therein, the spring clip biases the brush holder tube outwardly in its receptacle, to maintain the bayonet lugs 61 engaged against the inner face of the receptacle and thus confine the tube against axial displacement; and the bowing resilience of the spring clip also provides the detent engagement of the detent lugs 63 and the concavities or depressions 68 when the tube is rotated to its assembled position. To facilitate rotation of the tube in the receptacle, the tube may be provided with knobs 72 projecting radially from its enlarged head portion 57, and the detent lugs 63, as well as the bends in the spring clip which define the aligned depressions 68, may likewise be rounded to provide a smoother detent action.

From the foregoing description taken together with the accompanying drawings it will be apparent that this invention provides a novel brush holder, particularly well adapted for fractional horsepower electric motors by reason of its compactness, and which is simple, rugged and inexpensive and can be easily installed on and disassembled from a motor to permit ready replacement of a brush carried therein.

What is claimed as my invention is:

1. In a motor having an armature with a commutator at one end thereof, and a frame in which the armature is supported for rotation, means for readily removably mounting a brush on the frame, in contact with the commutator, said means comprising: a tube-like brush holder of insulating material in which a conductive brush is axially slidably carried and from the inner end of which an end portion of the brush projects for engagement with the commutator; means on the brush holder defining a pair of radial lugs, one near the inner end of the brush holder and one near its outer end; means on the motor frame defining a receptable having a bore therethrough with a diameter substantially equal to that of the brush holder and in which the brush holder is snugly axially receivable, the axis of said bore being radially aligned with the commutator, and said receptacle having a slot opening to said bore extending along the length thereof adapted to accommodate the lug near the inner end of the brush holder as the brush holder is inserted axially into the receptacle; a spring clip adapted to embrace the outer end portion of the brush holder and which is bowed to react between the outer end of the receptacle and the outer lug on the brush holder to bias the brush holder outwardly, said spring clip being bent to define an axially outwardly opening concavity in which the lug near the outer end of the brush holder tube is engageable with a detent action when the brush holder is in the receptacle and is rotated to a position in which the lug at its inner end is out of alignment with the slot to preclude axially outward displacement of the brush holder; and cooperating means on the spring clip and on the motor frame for precluding rotation of the spring clip relative to the motor frame so that the spring clip, by its detent cooperation with the brush holder, holds the latter against rotation.

2. In a motor having an armature with a commutator at one end thereof, and a frame in which the armature is supported for rotation, means for readily removably mounting a brush on the frame, in contact with the commutator, said means comprising: a brush holder tube of insulating material in which a conductive brush may be endwise slidably mounted and from the inner end of which an end portion of the brush may project for engagement with the commutator; means on the motor frame providing a receptacle having a bore with a diameter substantially equal to that of the brush holder tube, the axis of said bore being substantially radial to and in line with the commutator and said receptacle having an axial length sufficient to receive a substantial portion of the brush holder tube therein; cooperating means on said receptacle means and on the brush holder tube providing a bayonet connection between the brush holder tube and the receptacle whereby the brush holder tube may be axially inserted into the receptacle means in one position of rotation and may be rotated, when in the receptacle, to another position in which the bayonet connection holds the brush holder tube against axial displacement out of the receptacle; a radially projecting lug on the outer end portion of the brush holder tube; a spring clip adapted to embrace the outer end portion of the brush holder tube, inwardly of said lug, said spring clip being bowed to react between said lug and the receptacle means to bias the brush holder tube outwardly, and said spring clip having an axially outwardly opening concavity in which said lug on the brush holder tube is engageable with a detent action when the brush holder tube is rotated to its said other position; and cooperating means on the spring clip and on the motor frame precluding rotation of the spring clip so that the spring clip, by its detent cooperation with said lug, prevents rotation of the brush holder tube out of its said other position.

3. The motor of claim 2, further characterized by the fact that said spring clip is bent from resilient sheet material to a substantially W-shaped cross section, with the medial legs of the W providing said concavity with which the lug cooperates; and by the fact that said spring clip has a central aperture in which the outer end portion of the brush holder tube is engaged.

4. The motor of claim 2, further characterized by the fact that said means for precluding rotation of the spring clip comprises an abutment on the motor frame against which an edge portion of the spring clip engages.

5. In a motor having an armature with a commutator at one end thereof, and a frame in which the armature is supported for rotation, means for readily removably mounting a brush on the frame, in contact with the commutator, said means comprising: a brush holder tube of insulating material in which a conductive brush may be endwise slidably mounted and from the inner end of which an end portion of the brush may project for engagement with the commutator; means on the motor frame providing a receptacle with oppositely facing inner and outer surfaces, a bore with a diameter substantially equal to that of the brush holder tube opening to said surfaces, and a lengthwise extending slot opening to the bore, the axis of said bore being substantially radial to and in line with the commutator and said receptacle having an axial length sufficient to receive a substantial portion of the brush holder tube therein; abutment means on the end portions of the brush holder tube, facing toward one another, said abutment means at the inner end of the tube comprising a radially projecting lug adapted to pass along said slot in the receptacle means and to be rotated with the brush holder tube to a position in which it is out of alignment with the slot; a spring clip adapted to embrace an end portion of the brush holder tube inwardly of the abutment means thereon and bowed to resiliently react between the adjacent surface of the receptacle means and said abutment means to bias the brush holder tube in a direction in which its other abutment means is engaged with the other of said surfaces of the receptacle means; cooperating means on the spring clip and on the motor frame precluding rotation of the spring clip; and cooperating detent defining means on said one abutment means and on the spring clip rendered operative by the bowing bias of the spring clip and releasably holding the brush holder tube in a defined position of rotation in which said lug is out of alignment with said slot.

6. In an electric motor having an armature with a commutator at one end thereof, and a frame in which the armature is supported for rotation, means for readily removably mounting a brush on the frame, in contact with the commutator, said means comprising: a brush holder tube of insulating material in which a conductive brush may be endwise slidably mounted and from the inner end of which an end portion of the brush may project for engagement with the commutator, said brush holder tube having a substantially cylindrical exterior surface and means near its outer end defining an abutment facing its inner end; means on the frame providing a receptacle having a bore with a diameter substantially equal to that of said cylindrical surface of the brush holder tube so that the brush holder tube is axially insertable into the receptacle and rotatable therein, the axis of said bore in the receptacle means being substantially radial to and in line with the commutator and said receptacle means having a substantially flat outer face normal to the axis of the bore; cooperating means on said receptacle means and on the brush holder tube providing a bayonet connection between the brush holder tube and the receptacle whereby the brush holder tube may be axially inserted into the bore in the receptacle means in one position of rotation and may be rotated, when in the receptacle, to another position in which the bayonet connection holds the brush holder tube against axial displacement out of the receptacle; a resilient spring clip adapted to embrace the brush holder tube inwardly adjacent to the abutment means thereon, said spring clip being bowed to resiliently react between said outer face of the receptacle means and said abutment on the brush holder tube to bias the latter outwardly of the receptacle means; cooperating means on the motor frame and on the spring clip for precluding rotation of the spring clip; and cooperating detent defining means on said abutment on the brush holder tube and on the spring clip, rendered operative by the bowing bias of the spring clip and releasably engageable to hold the brush holder tube in its said other position of rotation.

7. In an electric motor having an armature with a commutator at one end thereof, and a frame in which the armature is supported for rotation, means for readily removably mounting a brush on the frame, in contact with the commutator, said means comprising: a brush holder tube in which a conductive brush can be endwise slidably mounted, and from the inner end of which an end portion of the brush can project for engagement with the commutator, said brush holder tube having a substantially cylindrical exterior surface and means near its outer end defining an abutment facing its inner end; means on the frame providing a receptacle having a bore with a diameter substantially equal to that of said cylindrical surface of the brush holder tube so that the brush holder tube is axially insertable into the receptacle and rotatable therein, the axis of said bore in the receptacle being substantially radial to and in line with the commutator, and said receptacle having an outer face substantially normal to the axis of the bore; cooperating means on said receptacle and on the brush holder tube providing a bayonet connection between the brush holder tube and the receptacle whereby the brush holder tube when in one position of rotation can be axially inserted into the bore in the receptacle from the outer end thereof and can be rotated, when in the receptacle, to another position in which the bayonet connection holds the brush holder tube against axial motion out of the receptacle; spring means reacting between said abutment on the brush holder tube and said surface on the receptacle to bias the brush holder tube radially outwardly in the receptacle when the bayonet connection is engaged; and cooperating means on the brush holder tube, the spring means and the receptacle for inhibiting rotation of the brush holder tube out of its said other position of rotation, said cooperating means providing a detent which is engaged upon rotation of the brush holder tube to its said other position and which is rendered operative by the reaction of the spring means between the receptacle and the brush holder tube.

8. In an electric motor having an armature with a commutator at one end thereof, and a frame in which the armature is supported for rotation, means for readily removably mounting a brush on the frame, in contact with the commutator, said means comprising: a tube-like brush holder element in which a conductive brush is axially slidably carried and from the inner end of which an end portion of the brush projects for engagement with the commutator, said brush holder element having means on its outer end defining an abutment facing its inner end; means on the motor frame defining a receptacle element having a bore therethrough with a diameter to slidably and rotatably receive the brush holder element, the axis of said bore being substantially radial to the commutator and in line therewith and said receptacle element having a surface at its outer end which is substantially normal to the axis of the bore; a lug on one of said elements engageable in a groove in the other and cooperating with said groove to provide a bayonet connection between the brush holder element and the receptacle element whereby the brush holder element can be axially inserted into the bore in the receptacle element, from the outer end thereof, when in one position of rotation and can be rotated, when in the receptacle element, to another position in which the bayonet connection is engaged to hold the brush holder element against axial displacement out of the receptacle element; and cooperating means on said elements defining a detent which is engaged by rotation of the brush holder element to its said other position of rotation to inhibit rotation of the brush holder element out of said other position, said cooperating detent defining means comprising a spring embracing the brush holder element and reacting between said surface on the receptacle element and the abutment on the brush holder element to bias the latter outwardly in the receptacle element.

References Cited in the file of this patent

UNITED STATES PATENTS

| | | |
|---|---|---|
| 676,308 | Geisenhoner | June 11, 1901 |
| 2,706,897 | Holoye | Apr. 26, 1955 |
| 2,752,514 | Schwenden | June 26, 1956 |
| 2,764,003 | Croset | Sept. 25, 1956 |
| 2,771,111 | Seyfried | Nov. 20, 1956 |
| 2,773,209 | Kirkwood | Dec. 4, 1956 |
| 2,788,038 | Corcoran | Apr. 9, 1957 |
| 2,841,723 | Corbett | July 1, 1958 |
| 2,870,354 | Antonidis et al. | Jan. 20, 1959 |